April 11, 1939.   C. B. HOWARD   2,153,621
VEHICLE SIGNAL SWITCH
Filed Feb. 9, 1937

INVENTOR.
CLARENCE B. HOWARD
BY Lippincott & Metcalf
ATTORNEYS.

Patented Apr. 11, 1939

2,153,621

UNITED STATES PATENT OFFICE 2,153,621

VEHICLE SIGNAL SWITCH

Clarence B. Howard, Oakland, Calif., assignor to E. H. Kueffer

Application February 9, 1937, Serial No. 124,863

1 Claim. (Cl. 200—59)

My invention relates to a vehicle signal switch, and more particularly to a switch adapted for use on a vehicle driven by an internal combustion engine for indicating acceleration and deceleration thereof. This application is a continuation in part of my prior application, Serial No. 98,657, filed August 31, 1936, now Patent No. 2,096,745, patented October 26, 1937.

In my prior application, referred to above, I have described a particular type of rotary switch frictionally operated to give a signal upon changes in rotation of a shaft, and I have shown this switch as applied to an automobile for the control of a stop light, or warning light, in such a manner that when the engine is accelerated no external indication is given, but when the engine is decelerated a warning light is illuminated by which other vehicles may be aware of this deceleration.

In that prior application I have shown the switch applied to an internal combustion engine as an accessory installed in an automobile so that the switch is operated by the longitudinal motion of the throttle rod, through a mechanical link.

The present application deals with a switch mounted directly upon the throttle valve axle of an internal combustion engine, which will indicate change in direction of rotation at any point in the complete arc of rotation of the axle, portions of the switch being built as integral parts of the engine. The switch is combined with the engine in such a manner that it is no longer an accessory to be mounted on the engine after it has been fully manufactured, but is made and assembled as a part of the original engine. By so combining the switch with the engine I have been able to greatly reduce the cost of the device, and have thus been able to provide the automobile industry with a warning switch at an exceptionally low price.

Among the objects of my invention are: To provide a switch operated directly by change of rotation of the butterfly axle in an engine intake; to provide a switch indicating change of rotation, certain parts of which are common with existing parts in an internal combustion engine; to provide a switch assembly mounted on the butterfly valve axle of an internal combustion engine; and to provide a simple, cheap and efficient warning signal for automobiles which can be supplied by the manufacturer at a minimum cost.

Other objects of my invention will be apparent or will be specifically pointed out in the description forming a part of this specification, but I do not limit myself to the embodiment of the invention herein described, as various forms may be adopted within the scope of the claims.

My invention may be more fully understood by reference to the drawing, wherein Figure 1 is a longitudinal sectional view of my invention mounted as a part of the intake system of an internal combustion engine used in a vehicle.

Figure 1:
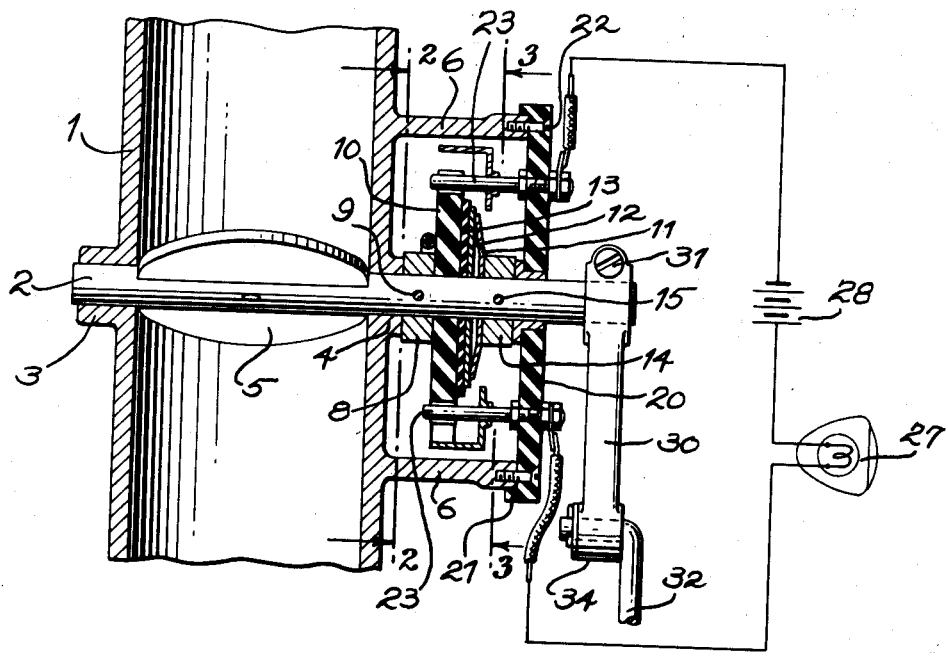
Figure 2:
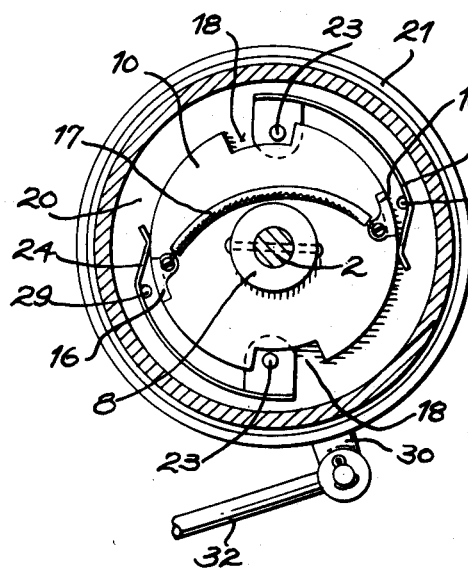
Figure 2 is a view partly in section and partly in elevation taken as indicated by the line 2—2 in Figure 1.
Figure 3:
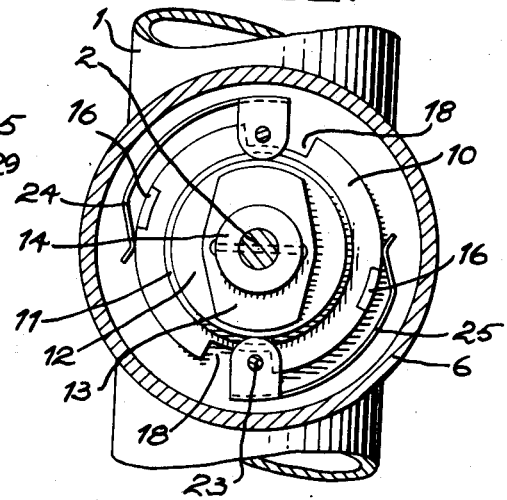
Figure 3 is a similar view taken as indicated by the line 3—3 in Figure 1.

In the preferred form of switch and mounting herein described I have been able to take advantage of the fact that modern intake manifolds are in most instances formed by casting, and thus have been able to provide at least a portion of the housing of my signal switch by having these portions cast integral with the intake manifold. Thus the cost of a separate housing is eliminated. One such casting is shown in the figures, where a cast intake manifold 1 has been provided with the usual throttle or butterfly valve axle 2, passing through the usual cast bearings 3 and 4 in the side walls of the intake conduit. The customary butterfly throttle valve 5 is mounted on the axle in the interior of the intake pipe. At the time the intake manifold is cast I prefer at the same time to integrally cast therewith side walls 6 of a switch housing, the side walls surrounding the butterfly axle 2 to provide a cavity wherein the signal switch may be mounted, and in this respect I prefer to make the housing wall 6 cylindrical and concentrically positioned with respect to the butterfly axle 2. The butterfly axle 2 is made slightly longer than is customary when no switch is utilized in this position, and preferably projects beyond the open end of the cylindrical side wall 6. In the cavity formed by the projecting side wall 6 I prefer to mount a switch so designed as to indicate direction of rotation of the butterfly axle 2, and one preferred form of this switch is the switch described and claimed in my prior application referred to above.

This type of switch is easily adapted for mounting on the extended butterfly axle 2, and in assembling this switch, first, a collar 8 is slipped over the end of the butterfly axle until it approaches axle bearing 4. It is then solidly attached to the axle by a pin 9. Next, a contact disc 10 of insulating material is slipped over the axle, the central aperture of the block being such that the block is free to rotate on the axle. Then a fiber clutch disc 11 is slipped on over the shaft, the latter also being free to rotate on the shaft, and a rotatable metal clutch disc 12 is positioned on top of the fiber disc and is held thereagainst by a spring 13, this latter spring being slightly bowed to apply pressure against the clutch discs, being maintained in position by a locking collar 14 which is also fixedly pinned to the shaft by a locking pin 15.

The contact disc 10 is provided with a pair of peripheral segmental contacts 16, the latter being joined by an electrical link 17 bent around the central metal portions and out of contact therewith. I also prefer to provide the contact disc 10 with a pair of opposite notches 18 therein.

The final step in the assembly of the device is the positioning of a housing cover 20 having a peripheral flange 21 engaging the cast side walls 6, and held thereon by cover screws 22. The housing cover is preferably of insulating material, and carries two stop pins 23 extending into the switch cavity and entering the notches in contact disc 10. Thus the edges of these notches will then determine the arc of rotation allowed to the contact disc 10. Brush contacts 24 and 25 are attached to the stop pins 23 and extend peripherally around the outside of the contact disc to make contact therewith at diametrically opposite positions. I prefer to position the notches 18 in such a manner that at one end of the disc travel contacts 16 and link 17 will complete an electrical circuit between stationary contacts 25, whereas, when the rotation of the disc is reversed and the edges of the notches 18 limit the travel of the disc in the opposite direction, the segmental contacts 16 are removed from contact with the stationary contacts 24 and 25, thus providing a break in the circuit. I have thus allowed only a short arc of rotation to disc 10. At one end of this arc a circuit is made; at the other end of the arc the circuit is broken. I also so position the segmental contacts 16 with relation to the stationary contacts 24 and 25 that when the throttle is opened and the engine accelerates, contact is broken, but when the direction of rotation of the butterfly axle is reversed and the engine therefore decelerates, contact is made. Thus a warning lamp 27 may be lighted by battery 28 through the switch when the engine is decelerated and is extinguished when the engine is accelerated, thereby providing an indication to other vehicles that deceleration is occurring in the speed of the car on which signal light 27 is mounted.

I find that it is convenient to pass stop pins 23 completely through the housing cover 20 and utilize their outer termini to make the electrical connection to the switch assembly. Inasmuch as the brush contacts 24 and 25 are resilient and would bend toward the axle during the positioning of the cover, I have provided the cover with assembly apertures 29 through which a pair of assembly pins, not shown, may be inserted into the casing to hold the brush contacts away from the periphery of the contact disc until the cover is in position. The pins are then removed and the brushes will bear against the periphery of the disc thereafter.

After the switch has been entirely assembled the usual throttle operating arm 30 is clamped thereon by means of clamp screw 31, and a throttle operating rod 32 is passed through a bearing 34 in the outer end of the arm in the usual manner.

At all times the warning light will indicate whether or not the throttle is being opened and closed. Furthermore, if the throttle is being opened continuously to a certain point, and this point maintained without closing the throttle at any time, the disc 10 will stay in position so that the signal will not light. Likewise, if the throttle is reduced the warning light goes on, and if the throttle is not again advanced immediately, the stop light will stay on during further reduction, or until the throttle is again opened. The contact disc 10 is driven solely by friction up to the point where stop pins engage the edges of the notches 18. Thereafter the butterfly valve axle may continuously turn without changing the the indicating position of the disc 10. Thus the indication will take place irrespective of the position of the throttle as far as the engine rotation is concerned.

It should be pointed out, however, that I do not wish, in this application, to be limited to the use of the particular form of switch mechanism shown herein, and while I have illustrated this switch as a preferred form it is obvious that other types of frictionally driven switches, giving an indication only upon change in direction of rotation of a shaft, may be utilized herein, as the main object of the present invention is the combination of such a switch mounted directly on the butterfly axle in an internal combustion engine.

I claim:

In combination with an internal combustion engine having a throttle valve in an intake manifold directly operated and mounted on a rotatable axle extending through the wall of said manifold, an electric switch mechanism directly mounted on a portion of said rotatable axle extending outside of said manifold, a friction clutch connected to rotate said switch mechanism by rotation of said rotatable axle, stationary contacts cooperating with said switch mechanism, and separate throttle operating means connected to said axle to cause rotation thereof, thereby simultaneously operating said throttle and said switch mechanism, stop means for limiting the rotation of said switch mechanism, and an enclosure for said switch mechanism forming an integral part of said manifold.

CLARENCE B. HOWARD.